United States Patent
Ward et al.

(10) Patent No.: US 12,490,309 B2
(45) Date of Patent: Dec. 2, 2025

(54) SYSTEMS AND METHODS FOR WI-FI COLLISION AVOIDANCE

(71) Applicant: Verizon Patent and Licensing Inc., Basking Ridge, NJ (US)

(72) Inventors: Rachel Y. Ward, Lewisville, TX (US); Matthew Scott Deatrick, Oak Ridge, NJ (US); Mun Wei Low, Irving, TX (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 379 days.

(21) Appl. No.: 18/335,766

(22) Filed: Jun. 15, 2023

(65) Prior Publication Data
US 2024/0422820 A1    Dec. 19, 2024

(51) Int. Cl.
*H04W 74/0816* (2024.01)
*H04W 84/12* (2009.01)

(52) U.S. Cl.
CPC ........ *H04W 74/0816* (2013.01); *H04W 84/12* (2013.01)

(58) Field of Classification Search
CPC .......... H04W 74/0816; H04W 84/12
See application file for complete search history.

(56) References Cited

U.S. PATENT DOCUMENTS

| | | | |
|---|---|---|---|
| 9,008,111 B2* | 4/2015 | An | H04W 52/0219 370/445 |
| 11,570,636 B2* | 1/2023 | Ergen | H04W 72/541 |
| 2017/0041956 A1* | 2/2017 | Abraham | H04W 74/0816 |

OTHER PUBLICATIONS

SON (Self Organizing Network). What is SON? Accessed online Jun. 15, 2023 https://www.verizon.com/support/residential/internet/equipment/network-extender/son#:~:text=What%20is%20S. 4 pages.
Wi-Fi EasyMesh. Accessed online Jun. 15, 2023 https://www.wi-fi.org/discover-wi-fi/wi-fi-easymesh. 5 pages.

* cited by examiner

*Primary Examiner* — Mohammad S Anwar

(57) ABSTRACT

A device may include a processor configured to collect first usage data from a first WI-FI router in a first customer premises equipment (CPE) network; collect second usage data from a second WI-FI router in a second CPE network; and determine that a collision avoidance plan between the first WI-FI router and the second WI-FI router is needed. The processor may be further configured to generate a first collision avoidance plan for the first WI-FI router and a second collision avoidance plan for the second WI-FI router based on the first usage data and the second usage data. The processor may be further configured to provide the first generated collision avoidance plan to the first WI-FI router and the second collision avoidance plan to the second WI-FI router.

20 Claims, 10 Drawing Sheets

SYSTEMS AND METHODS FOR WI-FI COLLISION AVOIDANCE

BACKGROUND INFORMATION

To satisfy the needs and demands of users of mobile communication devices, a provider of wireless communication services continues to improve and expand available services and networks used to deliver such services. Such improvements include the management of a networks and devices in a customer premises location. In order to maintain a quality of service in a customer premises location, a provider may need to take into account various conditions that vary across networks and devices in a customer premises location.

DETAILED DESCRIPTION OF EXAMPLE EMBODIMENTS

Figure 1:
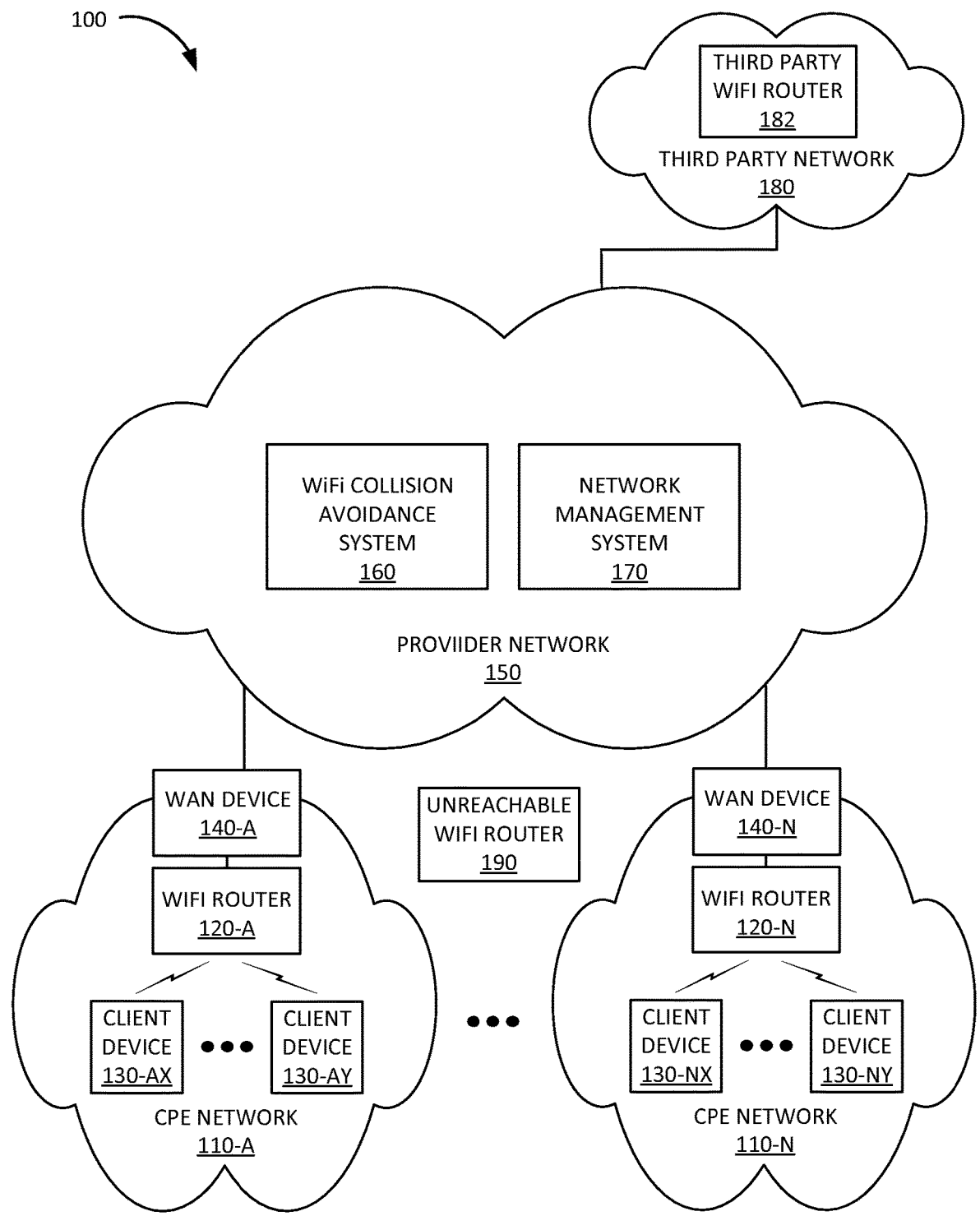
FIG. 1 illustrates an environment according to an implementation.

The following detailed description refers to the accompanying drawings. The same reference numbers in different drawings identify the same or similar elements.

Residences, businesses, and/or public spaces may include a Layer 2 and/or Layer 3 wireless local area network (WLAN) that enables devices to connect to the Internet or other networks. For example, a customer's home may be served by a router managed by a provider of communication services. The router may be connected to, or may function as, a Wireless Fidelity (WI-FI) access point (AP) that provides short-range wireless access for devices in the customer's home. Such a device may be referred to as a "WI-FI router." Various devices in the customer's home, such as a laptop computer, a tablet computer device, a mobile phone, and/or a gaming console may connect to the Internet via the WI-FI router. A WI-FI router may be owned and/or managed by a provider of communication services and may be referred to as customer premises equipment (CPE). Thus, a network in a customer's home, in a business, or any other indoor environment (and/or an associated outdoor environment) may be referred as a CPE network.

WI-FI routers operate in WLANs based on the Institute of Electrical and Electronics Engineers (IEEE) 802.11 standards. Such WLANs are referred to as WI-FI networks. A WI-FI network may include multiple access methods for collision avoidance. For example, a node on the WLAN network may first listen to the WLAN channel to determine whether another node is transmitting, before attempting to transmit. However, WI-FI networks operate on unlicensed bands, such as a 2.4 Gigahertz (GHz) band, a 5 GHz band, and/or a 6 GHz band. Because these bands are part of the unlicensed spectrum, there is no limit on the number of transmitters within a particular area. Therefore, nearby WI-FI routers in different WI-FI networks may experience and/or cause transmission collisions and/or other types of signal interference with each other. For example, the transmission range in the 2.4 GHz band may be up to 300 feet, which is greater than the size of many residences and offices.

Implementations described herein relate to systems and methods for WI-FI collision avoidance between WI-FI routers in different WI-FI networks. A "collision," as used herein, refers to signal interference between two WI-FI routers. A WI-FI collision avoidance system may collect usage data from WI-FI routers, in different WI-FI networks, within transmission ranges of each other, determine collision avoidance plans for the WI-FI routers based on the collected usage data, and provide the collision avoidance plans to the WI-FI routers to implement. For example, a computer device associated with the WI-FI collision avoidance system may be configured to collect first usage data from a first WI-FI router in a first CPE network and second usage data from a second WI-FI router in a second CPE network and determine that a collision avoidance plan between the first WI-FI router and the second WI-FI router is needed. The computer device may be further configured to generate a first collision avoidance plan for the first WI-FI router and a second collision avoidance plan for the second WI-FI router based on the first usage data and the second usage data and provide the first generated collision avoidance plan to the first WI-FI router and the second collision avoidance plan to the second WI-FI router. In some implementations, collision avoidance plans may be generated using one or more trained machine learning models.

The usage data may include historical usage data collected over a set of time periods and may include information relating to WI-FI router parameters during each time period, such as, for example, an identifier for a channel used by a WI-FI router during a time period, an amount of data sent or received using the channel, a type of data sent or received using the channel, a radio frequency (RF) power generated by the WI-FI router during the time period, a signal strength measured by a client device of the WI-FI router during the time period, a signal strength of the client device signal measured by first WI-FI router during the time period, and/or other types of WI-FI router parameters. A collision avoidance plan may include a set of time period settings, with each time period setting specifying a band and/or channel and RF power to be used by a WI-FI router during the time period.

A WI-FI router managed by the WI-FI collision avoidance system may be authenticated using a secure element installed on the WI-FI router. Furthermore, the WI-FI collision avoidance system may provide a collision avoidance application to the WI-FI router. The application may collect the usage data, provide the usage data to the WI-FI collision avoidance system, receive a collision avoidance plan from the WI-FI collision avoidance system, and execute the received collision avoidance plan.

The WI-FI collision avoidance system may be associated with a provider of communication services that manages WI-FI routers to which the WI-FI collision avoidance system has provided the collision avoidance application. Furthermore, the WI-FI collision avoidance system may include a third-party interface to enable collision avoidance for WI-FI routers associated with a different provider of communication services. For example, the WI-FI collision avoidance system may receive, via the third-party interface, usage data from a WI-FI router associated with the different provider and determine that a collision avoidance plan is needed between the WI-FI router associated with the different provider and one or more routers managed by the WI-FI collision avoidance system. The WI-FI collision avoidance system may then generate a first collision avoidance plan for the WI-FI router associated with the different provider and a second collision avoidance plan for the one or more routers managed by the WI-FI collision avoidance system. The WI-FI collision avoidance system may provide the first collision avoidance plan to the WI-FI router associated with the different provider via the third-party interface, and provide the second collision avoidance plan to the one or more routers managed by the WI-FI collision avoidance system.

Furthermore, the WI-FI collision avoidance system may include a network management system interface. For example, the WI-FI collision avoidance system may obtain network performance information relating to a CPE network and may take the network performance information into account when generating a collision avoidance plan for a WI-FI router associated with the CPE network. Additionally, the WI-FI collision avoidance system may report usage data obtained from WI-FI routers to the network management system. The network management system may use the obtained usage data to improve network performance. For example, the network management system interface may generate a recommendation to deploy more cellular base stations in an area with a large number of reported WI-FI collisions to offload WI-FI traffic into a Radio Access Network (RAN) associated with a cellular network.

Moreover, the WI-FI collision avoidance system may detect the presence of an unreachable WI-FI router. For example, a WI-FI router may report collisions with another WI-FI router not managed by the WI-FI collision avoidance system and not reachable via the third-party interface. In response, the WI-FI collision avoidance system may generate a collision avoidance plan for the WI-FI router, which reported interference from the unreachable WI-FI router, that includes settings for the WI-FI router that cause the unreachable WI-FI router to adjust its settings to reduce collisions with the WI-FI router. For example, the WI-FI collision avoidance system may apply game theory principles to cause the unreachable WI-FI router to abandon a channel and/or select another channel during particular time periods. As an example, the WI-FI collision avoidance system may instruct multiple WI-FI routers to overwhelm a channel with RF power greater than a threshold to cause the unreachable WI-FI router to abandon the channel. As another example, the WI-FI collision avoidance system may instruct multiple WI-FI routers to occupy a channel in a round-robin cycle (e.g., one at a time, two at a time, etc.) to ensure the unreachable WI-FI router cannot make use of the channel. As yet another example, the WI-FI collision avoidance system may instruct multiple WI-FI routers to abandon a channel during a time period to entice the unreachable WI-FI router to select to use the channel.

In some implementations, a WI-FI router may be configured to communicate with nearby other WI-FI routers directly in order to reduce WI-FI collisions. For example, the WI-FI router may provide information about channels, RF power levels, and time periods that the WI-FI router is using, or plans to use in the future, to enable another WI-FI router, such as a WI-FI router that is unreachable by the WI-FI collision avoidance system, to adjust its settings based on the provided information in order to reduce potential WI-FI collisions. Furthermore, the WI-FI router may be configured to communicate with the other WI-FI router to perform negotiations to arrive at a set of collision avoidance plans without requiring the involvement of the WI-FI collision avoidance system. In some implementations, the set of agreed-upon collision avoidance plans may be stored in a blockchain maintained by a set of WI-FI routers in a geographic area.

FIG. 1 is a diagram of an exemplary environment 100 in which the systems and/or methods described herein may be implemented. As shown in FIG. 1, environment 100 may include CPE networks 110-A to 110-N (referred to herein collectively as "CPE networks 110" and individually as "CPE network 110"), a provider network 150 that includes a WI-FI collision avoidance system 160 and a network management system 170, a third-party network 180, and an unreachable WI-FI router 190.

Customer premises network 110 may include a WLAN associated with a customer's premises. For example, customer premises network 110 may reside in a residential home, in an apartment building, in a school, in a commercial office building, in a shopping mall, and/or in another type of location associated with a customer of a provider of telecommunication services. Customer premises network 110 may include a WI-FI router 120, client devices 130-AX to 130-AY (referred to herein collectively as "client devices 130" and individually as "client device 130"), and a Wide Area Network (WAN) device 140.

WI-FI router 120 may include a network device configured to function as a switch and/or router for devices in customer premises network 110 and may function as an access point that connects devices in customer premises network 110 to a WAN, such as provider network 150, via WAN device 140. WI-FI router 120 may include a layer 2 and/or layer 3 network device, such as a switch, router, firewall, and/or gateway and may support different types of interfaces, such as an Ethernet interface, a WI-FI interface, a Multimedia over Coaxial Alliance (MoCa) interface, and/or other types of interfaces.

WI-FI router 120 may include an RF transceiver configured to communicate with client devices 130 using WI-FI signals based on the IEEE 802.11 standards for implementing a WLAN network. For example, WI-FI router 120 may be configured to operate in one or more WI-FI bands, such as the 2.4 GHz band, the 5 GHz band, 6 GHz band, the 60 GHz band, and/or other WI-FI bands. WI-FI router 120 may be configured to select a channel for communication from a set of available channels in each band. WI-FI router 120 may include a collision avoidance application obtained from WI-FI collision avoidance system 160. The collision avoidance application may report usage data to WI-FI collision avoidance system 160 and obtain a collision avoidance plan from WI-FI collision avoidance system 160.

Client device 130 may include any computer device with functionality to connect to a WI-FI router 120 using WI-FI wireless signals. For example, client device 130 may include a handheld wireless communication device (e.g., a mobile phone, a smart phone, etc.); a wearable computer device (e.g., a head-mounted display computer device, a wristwatch computer device, etc.); a laptop computer, a tablet computer, or another type of portable computer; a desktop computer; a set-top box or a digital media player; a smart television; a portable gaming system; a home appliance device; a home monitoring device; and/or any other type of computer device with wireless communication capabilities. As another example, client device 130 may correspond to an embedded wireless device that communicates wirelessly with other devices over an M2M interface using MTC and/or another type of M2M communication.

WAN device 140 may interface customer premises network 110 to provider network 150 via a wireless connection and/or via a wired connection. Thus, provider network 150 may function as an Internet Service Provider (ISP) for CPE network 110 via WAN device 140. As an example, WAN device 140 may include an optical network terminal (ONT). An ONT may connect to provider network 150 via an optical fiber and may function as a gateway device to Gigabit Passive Optical Network (GPON) or a GPON2 located in provider network 150. As another example, WAN device 140 may connect to provider network 160 via a wired electrical connection, such as a coaxial cable. As yet another example, WAN device 140 may include a fixed wireless access (FWA) transceiver configured to communicate with provider network 150 via a wireless access network (not shown in FIG. 1) using cellular wireless signals.

Provider network 150 may be managed, at least in part, by a provider of communication services that manages WAN device 140 and/or WI-FI router 120. Provider network 150 may include a local area network (LAN), a wide area network (WAN), a metropolitan area network (MAN), an optical network, a cable television network, a satellite network, a wireless network (e.g., a Fourth Generation (4G) Long Term Evolution (LTE) network, a Fifth Generation (4G) New Radio (NR) network, etc.), an ad hoc network, a telephone network (e.g., the Public Switched Telephone Network (PSTN) or a cellular network), an intranet, or any combination thereof. Provider network 150 may include a WI-FI collision avoidance system 160 and a network management system 170.

WI-FI collision avoidance system 160 may include one or more computer devices, such as server devices and/or cloud computing devices, configured to reduce WI-FI collisions in CPE networks 110. WI-FI collision avoidance system 160 may provide a collision avoidance application to WI-FI routers 120 to collect usage data and provide the usage data to WI-FI collision avoidance system 160. WI-FI collision avoidance system 160 may generate collision avoidance plans for WI-FI routers 120 based on the obtained usage data and provide the generated collision avoidance plans to the collision avoidance application on WI-FI routers 120 to carry out. WI-FI collision avoidance system 160 may communicate with network management system 170 to improve the performance of CPE networks 110 and/or provider network 150.

Network management system 170 may include one or more computer devices, such as server devices and/or cloud computing devices, configured to manage network devices and/or network connections in provider network 150 and/or CPE network 110. Network management system 170 may provide information relating to network performance of provider network 150 and/or CPE network 110 to WI-FI collision avoidance system 160. Furthermore, network management system 170 may receive information from WI-FI collision avoidance system 160 relating to usage data associated with WI-FI routers 120. Network management system 170 may perform network management functions based on the received usage data.

Third-party network 180 may be associated with a different provider of communication services. Third-party network 180 may include a third-party WI-FI router 182. Third-party network 180 may exchange information relating to WI-FI routers 182 in third-party network 180 with WI-FI collision avoidance system 160. WI-FI collision avoidance system 160 may take into account information relating to WI-FI routers 182 in third-party network 180 when generating collision avoidance plans. Unreachable WI-FI router 190 may correspond to a WI-FI router that may be interfering with one or more CPE networks 110 and may be unreachable by WI-FI collision avoidance system 160. WI-FI collision avoidance system 160 may generate a collision avoidance plan for a particular WI-FI router 120 that causes unreachable WI-FI router 190 to respond and adjust a setting in order to reduce collisions with the particular WI-FI router 120.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
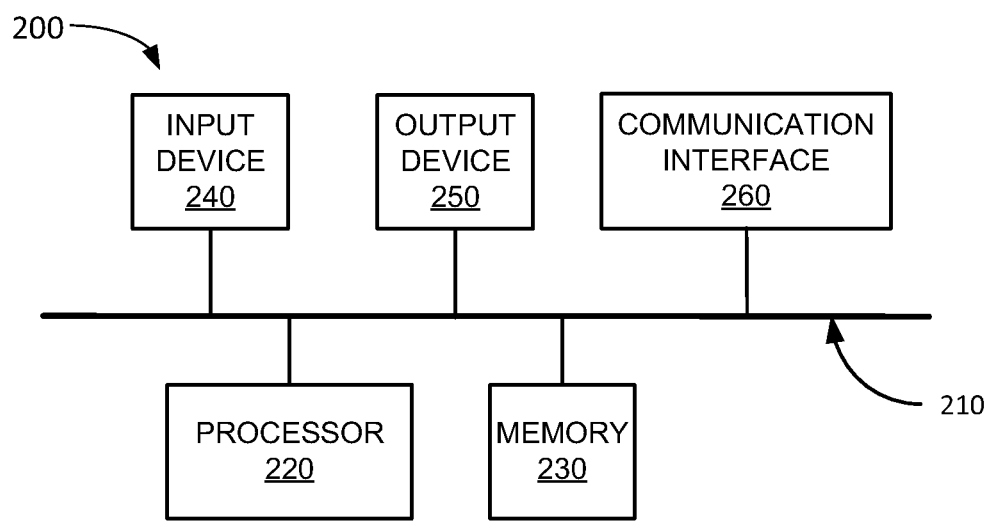
FIG. 2 illustrates exemplary components of a device that may be included in a component of an environment according to an implementation described herein.

FIG. 2 illustrates example components of a device 200 according to an implementation described herein. WI-FI router 120, client device 130, WAN device 140, WI-FI collision avoidance system 160, network management system 170, third-party WI-FI router 182, and/or unreachable WI-FI router 190 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. Additionally, or alternatively, processor 320 may include a hardware accelerator integrated circuit or processing logic, such as a graphics processing unit (GPU), a tensor processing unit (TPU), and/or another type of hardware accelerator.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WI-FI) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, in an implementation, device 200 may perform certain operations relating to WI-FI collision avoidance. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
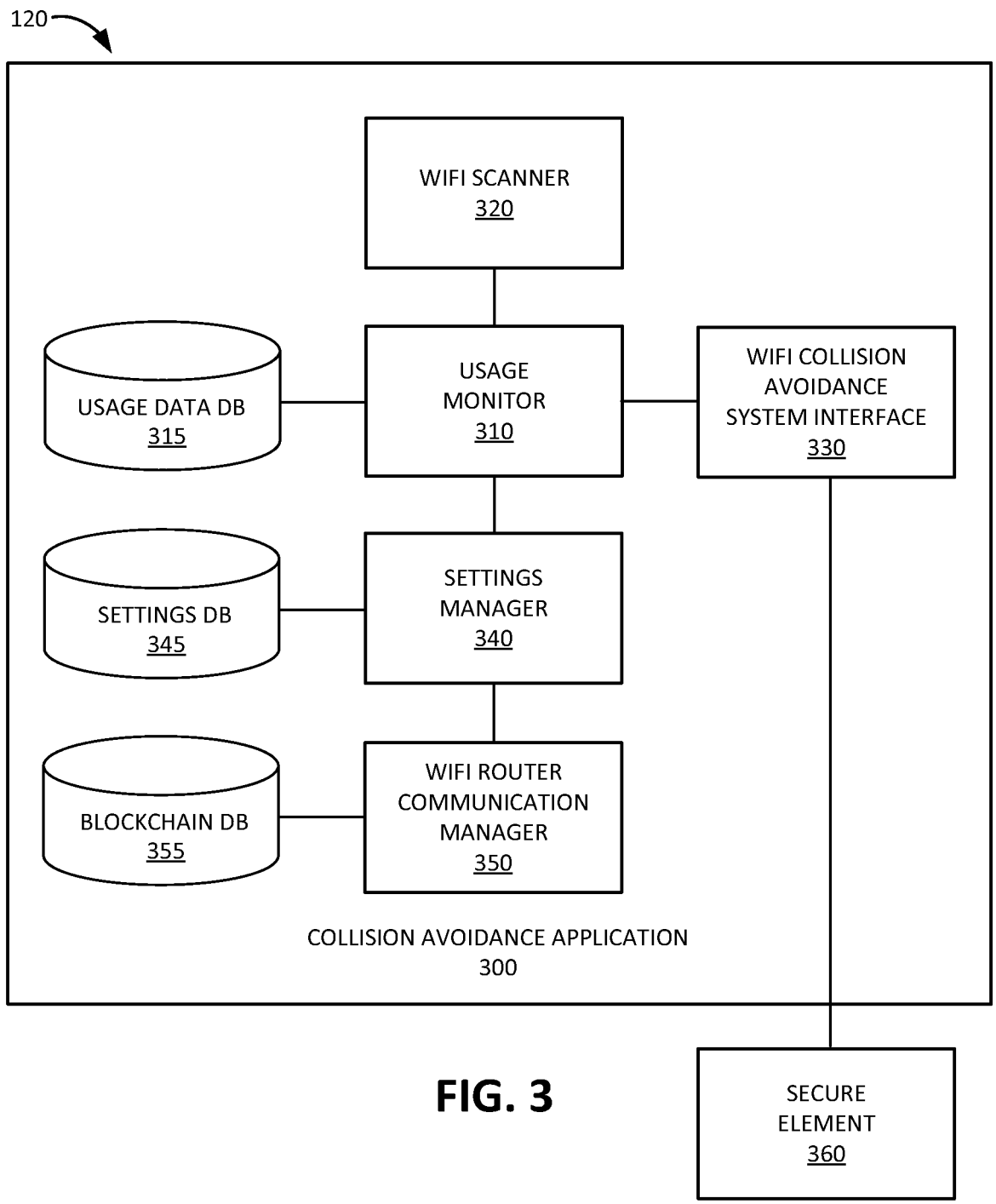
FIG. 3 illustrates exemplary components of a WI-FI router according to an implementation described herein.

FIG. 3 is a diagram illustrating exemplary components of WI-FI router 120. The components of WI-FI router 120 may be implemented, for example, via processor 220 executing instructions from memory 230. Alternatively, some or all of the components of WI-FI router 120 may be implemented via hard-wired circuitry. As shown in FIG. 3, WI-FI router 120 may include a collision avoidance application 300 and a secure element 360. Secure element 360 may store authentication credentials associated with WI-FI router 120 and may be used to authenticate and/or authorize WI-FI router 120 with provider network 150 an/or WI-FI collision avoidance system 160.

Collision avoidance application 300 may be obtained from WI-FI collision avoidance system 160 and may perform functions relating to avoiding WI-FI collisions with WI-FI routers 120 in other CPE networks 110. Collision avoidance application 300 may include a usage monitor 310, a usage data database (DB) 315, a WI-FI scanner 320, a WI-FI collision avoidance system interface 330, a settings manager 340, a settings DB 345, a WI-FI router communication manager 350, and a blockchain DB 355.

Usage monitor 310 may monitor usage data associated with WI-FI router 120. Usage data DB 315 may store usage data collected by usage monitor 310. For example, usage monitor 310 may record, at particular intervals, an identifier for a channel used by WI-FI router 120 during a time period, an amount of data sent or received using the channel, a type of data sent or received using the channel, a level of RF power generated by WI-FI router 120 during the time period, a signal strength measured by client device 130 during the time period, a signal strength of signal from client device 130 measured by WI-FI router 120 during the time period, and/or other types of WI-FI router parameters. Furthermore, usage monitor 310 may obtain information relating to other WI-FI routers 120 from WI-FI scanner 320.

WI-FI scanner 320 may scan for WI-FI signals associated with nearby WI-FI routers 120. For example, WI-FI scanner 320 may scan through a set of channels in a band at particular intervals and determine whether a signal from another WI-FI router 120 is detected. WI-FI scanner 320 may determine and record a signal strength of detected signals from other WI-FI routers 120.

WI-FI collision avoidance system interface 330 may be configured to communicate with WI-FI collision avoidance system 160. For example, WI-FI collision avoidance system interface 330 may send usage statistics associated with WI-FI router 120 at particular intervals and may receive a collision avoidance plan from WI-FI collision avoidance system 160 at particular intervals and provide the WI-FI collision avoidance plan to settings manager 340 to store in settings DB 345. Settings manager 340 may control one or more settings associated with WI-FI router 120 based on a collision avoidance plan received and stored in settings DB 345. For example, settings manager 340 may set WI-FI router 120 to a particular channel and broadcast signals to client devices 130 at a particular power level during a particular time period based on a collision avoidance plan received from WI-FI collision avoidance system 160.

WI-FI router communication manager 350 may be configured to communicate with other WI-FI routers 120, third-party WI-FI router 182, and/or unreachable WI-FI router 190. In some implementations, WI-FI router communication manager 350 may broadcast information to other WI-FI routers, such as unreachable router 190, that may enable other WI-FI routers to adjust a setting to reduce WI-FI collisions. For example, WI-FI communication manager 350 may broadcast, as particular intervals and using WI-FI signals, a "tracer shot packet" that includes information about settings selected by WI-FI router 120, such as settings based on a collision avoidance plan. If unreachable WI-FI router 190 receives such a "tracer shot packet," unreachable WI-FI router 190 may be able to configure itself to reduce WI-FI collisions by, for example, avoiding a channel identified in the "tracer shot packet" during a particular time period.

Additionally, or alternatively, WI-FI router communication manager 350 may perform, via WI-FI signals, negotiations with other WI-FI routers, such as unreachable WI-FI router 190 to arrive at mutually agreeable collision avoidance plans. For example, WI-FI router communication manager 350 may send a proposed collision avoidance plan to unreachable WI-FI router 190. The proposed collision avoidance plan may include a set of time periods, and channel and RF power for each time period in the set of time periods, to be used by WI-FI router 120 and avoided by unreachable WI-FI router 190. Unreachable WI-FI router 190 may respond with a counter-proposal collision avoidance plane and WI-FI router 120 and unreachable WI-FI router 190 may negotiate until an agreement is reached.

In some implementations, WI-FI router 120 may coordinate with WI-FI collision avoidance system 160 to use a trained machine learning model, and/or use a locally maintained trained machine learning model, to perform the negotiations with unreachable WI-FI router 190. Unreachable WI-FI router 190 may also include a trained machine learning model to perform the negotiations. The machine learning models may be trained using real world data, and/or synthesized data, and based on rules defined by WI-FI standards, to determine how a combination of WI-FI routers performs in different RF environments using different combinations of channel and RF power settings over a series of time periods.

A set of agreed-upon collision avoidance plans may be stored on a collision avoidance plan blockchain. The collision avoidance plan blockchain may be stored in blockchain DB 355 and used to verify, enforce, modify, and/or otherwise manage collision avoidance plans generated via negotiations between different WI-FI routers that do not share a WI-FI collision avoidance system. A collision avoidance plan blockchain may associated with a geographic area (e.g., an apartment building, a neighborhood, etc.). In some implementations, WI-FI routers in the geographic area may function as blockchain nodes that maintain the collision avoidance plan blockchain. In other implementations, WI-FI collision avoidance system 160 may function as a central authority that maintains the collision avoidance plan blockchain.

In some implementations, a WI-FI router that refuses to participate in the collision avoidance plan blockchain, and/or a WI-FI router that does not configure itself in accordance with an agreed-upon collision avoidance plan in the blockchain, may be designated as a rogue WI-FI router and other WI-FI routers associated with the blockchain may cooperate to prevent the rogue WI-FI router from being able to use channels and/or times designated for other WI-FI routers in a collision avoidance plan (e.g., by "gaming" the rogue WI-FI router to cause the rogue WI-FI router to abandon a channel, etc.).

Although FIG. 3 shows exemplary components of WI-FI router 120 according to an implementation, in other implementations, WI-FI router 120 may include fewer components, different components, additional components, or differently arranged components than depicted in FIG. 3. Additionally, or alternatively, one or more components of WI-FI router 120 may perform one or more tasks described as being performed by one or more other components of WI-FI router 120.

Figure 4:
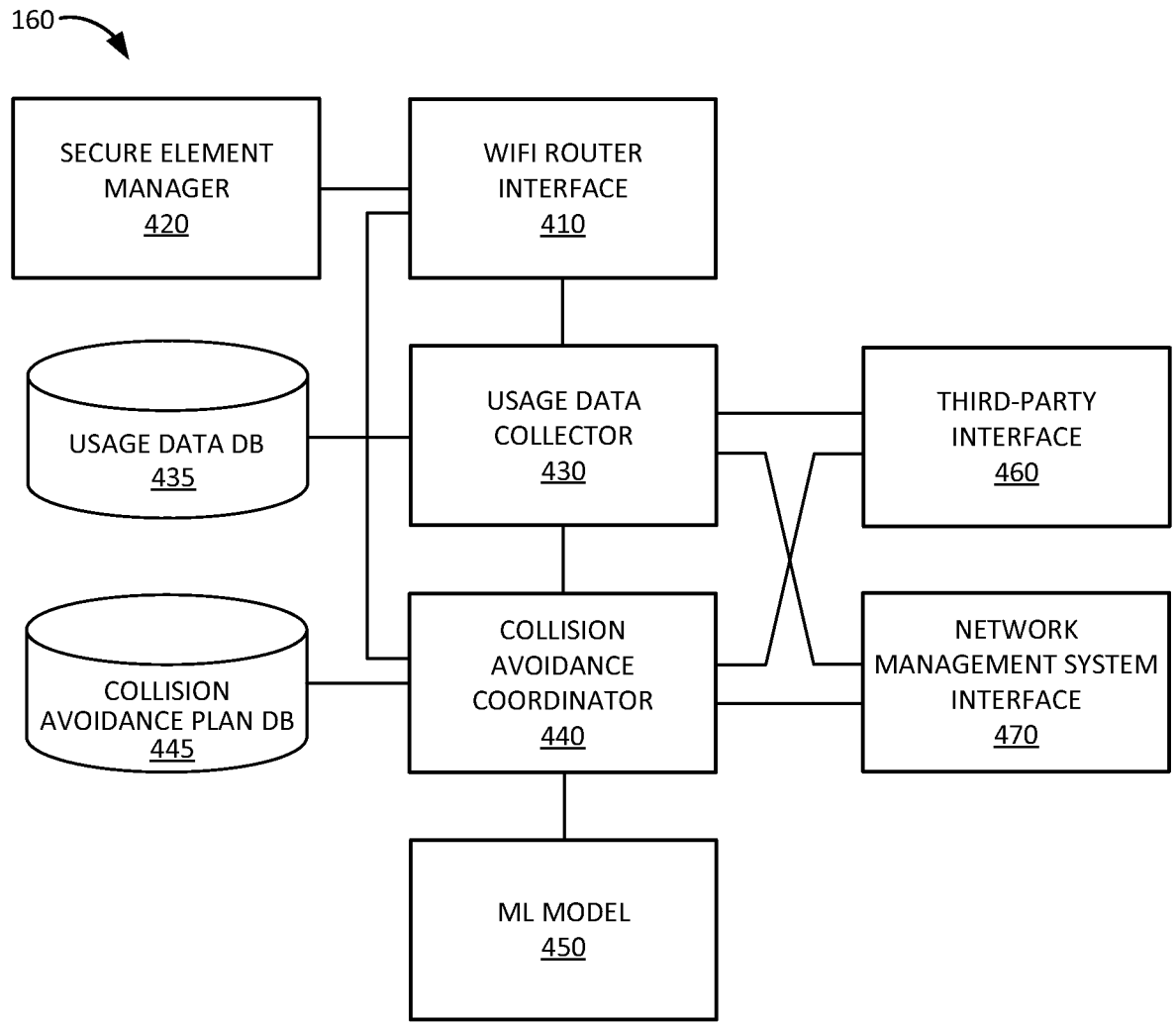
FIG. 4 illustrates exemplary components of a WI-FI collision avoidance system according to an implementation described herein.

FIG. 4 is a diagram illustrating exemplary components of WI-FI collision avoidance system 160. The components of WI-FI collision avoidance system 160 may be implemented, for example, via processor 220 executing instructions from memory 230. Alternatively, some or all of the components of WI-FI collision avoidance system 160 may be implemented via hard-wired circuitry. As shown in FIG. 4, WI-FI collision avoidance system 160 may include a WI-FI router interface 410, a secure element manager 420, a usage data collector 430, a usage data DB 435, a collision avoidance coordinator 440, a collision avoidance plan DB 445, a machine learning (ML) model 450, a third-party interface 460, and a network management system interface 470.

WI-FI router interface 410 may be configured to communicate with WI-FI routers 120. For example, WI-FI router interface 410 may provide an application programing interface (API) accessible by collision avoidance application 400 to report usage data and/or to receive a collision avoidance plan. Secure element manager 420 may authenticate secure element 360 in WI-FI routers 120. For example, secure element manager 420 may ensure credentials stored in secure element 360 are valid and that WI-FI router 120 is authorized to access provider network 150 via WAN device 140.

Usage data collector 430 may collect usage data from WI-FI routers 120 at particular intervals and store the collected usage data in usage data DB 435. Exemplary information that may be stored in usage data DB 435 is described below with reference to FIG. 5.

Collision avoidance coordinator 440 may generate collision avoidance plans for WI-FI routers 120, store the generated collision avoidance plans in collision avoidance plan DB 445, and provide the generated collision avoidance plans to WI-FI routers 120. Exemplary information that may be stored in collision avoidance plan DB 445 is described below with reference to FIG. 6.

Collision avoidance coordinator 440 may, for each particular WI-FI router 120, determine whether the particular WI-FI router 120 needs a collision avoidance plan. Collision avoidance coordinator 440 may determine whether the particular WI-FI router 120 has experienced a WI-FI collision with another router and/or whether another WI-FI router 120 is within a transmission range. For example, collision avoidance coordinator 440 may determine that the particular WI-FI router 120 needs a collision avoidance plan if the particular WI-FI router 120 experienced low signal strength below a signal strength threshold, if the particular WI-FI router 120 has detected signals from another WI-FI router 120 during a WI-FI scan, and/or based on the location of the particular WI-FI router 120 with respect to other WI-FI routers 120 (and/or third-party WI-FI routers 182).

Collision avoidance coordinator 440 may group WI-FI routers 120 that are determined to need a collision avoidance plan into collision avoidance groups. Collision avoidance coordinator 440 may group WI-FI routers 120 based on geographic location, address (e.g., WI-FI routers 120 in the same building, adjacent building, etc.), based on WI-FI routers 120 that detected one another during a WI-FI scan, and/or based on other criteria. In some implementations, collision avoidance coordinator 440 may cluster WI-FI routers 120 into collision groups using a machine learning model trained to cluster WI-FI routers 120 into collision groups using one or more criteria as described above.

Collision avoidance coordinator 440 may coordinate collision avoidance plans in a collision group by selecting time periods, channels and/or bands, and RF transmission power levels for WI-FI routers 120 in the collision group to reduce and/or minimize WI-FI collisions between WI-FI routers 120 in the collision group. For example, collision avoidance coordinator 440 may distribute available channels and/or bands among the WI-FI routers 120 in the collision group so that each WI-FI router 120 is using a different channel. Collision avoidance coordinator 440 may take into account signal strength and/or quality experienced by WI-FI routers 120 and/or client devices 130 on different channels when determining which WI-FI channel 120 should be assigned to which channel. If multiple WI-FI routers 120 need to share a channel, collision avoidance coordinator 440 may assign the channel to different WI-FI routers 120 for different time slots and/or may assign varying power levels to the different WI-FI routers 120 to reduce interference.

Collision avoidance coordinator 440 may use ML model 450 to generate collision group and/or collision avoidance plans for WI-FI routers 120 in a collision group. ML model 450 may include a deep learning neural network model and/or another type of ML model. In some implementations, ML model 450 may be trained to generate collision avoidance plans using supervised learning based on a training set that includes usage data for a set or WI-FI routers 120 and collision avoidance plans manually generated by a domain expert. In other implementations, ML model 450 may be trained to generate collision avoidance plans using unsupervised learning. For example, output during the training phase may be evaluated by simulating a generated set of collision avoidance plans using mathematical WI-FI router models, determining the number and severity of WI-FI collisions in the WI-FI router models based on the generated set of collision avoidance plans, and iterating the process until a minimum number of WI-FI collisions is achieved.

Third-party interface 460 may be configured to communicate with third-party network 180. For example, third-party interface 460 may provide an API accessibly by a third-party system, such a WI-FI collision avoidance system operated by another provider in third-party network 180 that manages third-party WI-FI routers 182. The API may enable the third-party system to establish a secure and trusted connection with WI-FI collision avoidance system 160 to exchange usage data relating to WI-FI routers 120. For example, third-party interface 460 may receive information identifying locations of third-party routers 182 and may determine whether any third-party routers 182 are within a transmission distance of WI-FI routers 120. As another example, third-party interface 460 may receive information identifying WI-FI routers 120 detected during a WI-FI scan by third-party router 182. Furthermore, third-party interface 460 may provide usage information relating to WI-FI routers 120 to the third-party system to enable the third-party system to generate collision avoidance plans for third-party routers 182.

WI-FI collision avoidance system 160 may include one or more third-party WI-FI routers 182 in a collision group and generate collision avoidance plans for WI-FI routers 120 in the collision group while taking the one or more third-party WI-FI routers 182 into account. Furthermore, in some implementations, WI-FI collision avoidance system 160 may generate a collision avoidance plan for a third-party WI-FI router 182 in a collision group and provide the generated collision avoidance plan as a recommendation to the third-party system via third-party interface 460.

Additionally, WI-FI collision avoidance system 160 may identify one or more unreachable WI-FI routers 190 associated with a collision group. For example, WI-FI router 120 may detect unreachable WI-FI router 190 during a WI-FI scan or WI-FI collision avoidance system 160 may determine that an unidentified WI-FI router exists based on collisions and/or interference experienced by WI-FI routers 120. WI-FI collision avoidance system 160 may generate a collision avoidance plan for one or more WI-FI routers 120, based on game theory principles, so that implementing the plan by WI-FI routers 120 causes unreachable WI-FI router 190 to adjust its settings to reduce collisions with WI-FI routers 120. For example, the collision avoidance plans may instruct multiple WI-FI routers 120 to transmit at a same channel with an RF power higher than a threshold at the same time, to cause unreachable WI-FI router 190 to stop using the channel and to switch to another channel. As another example, the collision avoidance plans may instruct multiple WI-FI routers 120 to occupy a channel in a round-robin format to cause unreachable WI-FI router 190 to abandon the channel. As yet another example, the collision avoidance plans may instruct multiple WI-FI routers 120 to abandon a particular channel to entice unreachable WI-FI router 190 to start using the abandoned channel.

Network management system interface 470 may be configured to communicate with network management system 170. For example, network management system interface 470 may provide usage data relating to CPE networks 110 in a particular location to network management system 170 and may generate a recommendation to deploy more cellular base stations in the location, based on a large number of reported WI-FI collisions, in order to offload WI-FI traffic onto a cellular RAN associated with provider network 150. Furthermore, network management system interface 470 may receive network management information from network management system 170 and use the received network management information in generating collision avoidance plans. For example, the network management information may include information relating to traffic loads in CPE networks 110 and the traffic load information may be used to determine which channels to assign to which WI-FI routers 120 (e.g., by assigning high throughput channels in a higher frequency band to WI-FI routers 120 in CPE networks 110 associated with higher traffic loads, etc.).

Although FIG. 4 shows exemplary components of WI-FI collision avoidance system 160, in other implementations, WI-FI collision avoidance system 160 may include fewer components, different components, additional components, or differently arranged components than depicted in FIG. 4. Additionally, or alternatively, one or more components of WI-FI collision avoidance system 160 may perform one or more tasks described as being performed by one or more other components of WI-FI collision avoidance system 160.

Figure 5:
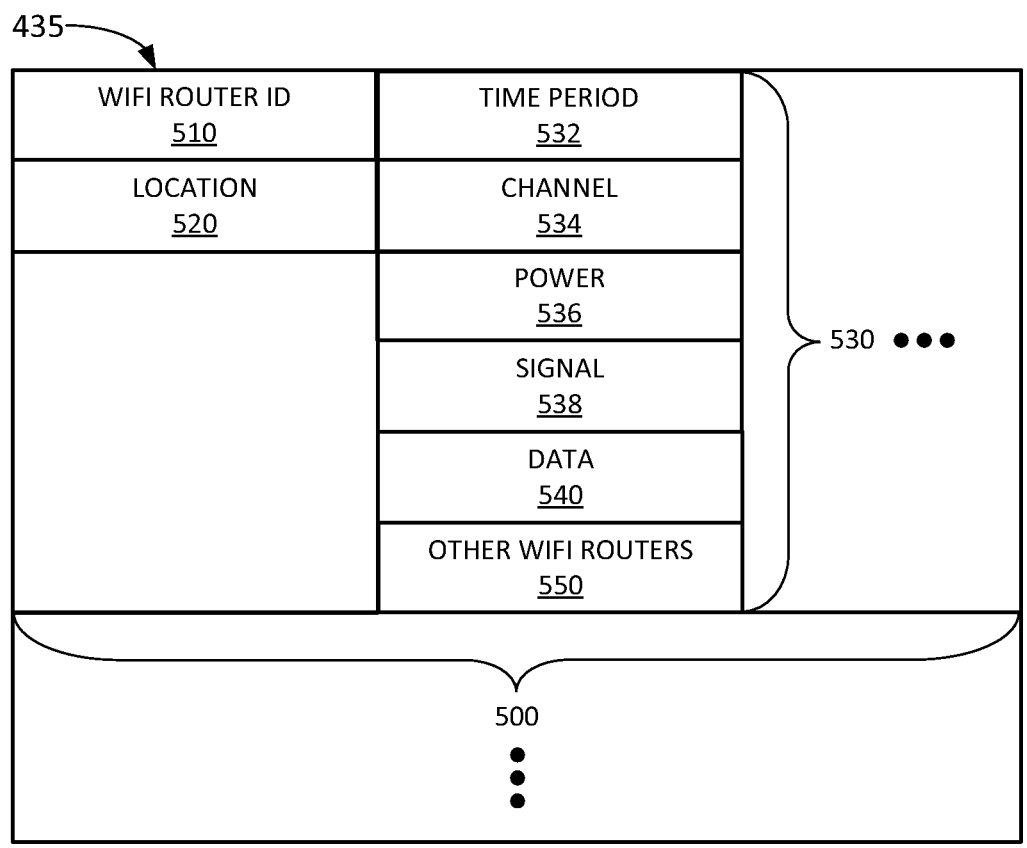
FIG. 5 illustrates exemplary components of a usage data database according to an implementation described herein.

FIG. 5 illustrates exemplary components of usage data DB 435. As shown in FIG. 5, usage data DB 435 may include WI-FI router records 500. Each WI-FI router record 500 may store information relating to a particular WI-FI router 120. WI-FI router record 500 may include a WI-FI router identifier (ID) field 510, a location field 520, and one or more usage data records 530. WI-FI router ID field 510 may store an ID associated with the particular WI-FI router 120. Location field 520 may store location information for the particular WI-FI router 120, such as, for example, a street address for the particular WI-FI router 120, Global Positioning System (GPS) coordinates for the particular WI-FI router 120, location information associated with WAN device 140 associated with the particular WI-FI router 120, and/or other types of location information.

Each usage data record 530 may store usage data for the particular WI-FI router 120 corresponding to a particular time period. Usage data record 530 may include a time period field 532, a channel field 534, a power field 536, a signal field 538, a data field 540, and an other WI-FI routers field 550.

Time period field 532 may identify a particular time period associated with the usage data in usage data record 530. Channel field 534 may identify one or more channels and/or bands used by the particular WI-FI router 120 during the particular time period. Power field 536 may identify the RF transmission power used by the particular WI-FI router 120 during the particular time period. Signal field 538 may store values for one or more signal strength and/or signal quality measured by the particular WI-FI router 120 during the particular time period and/or measured by client devices 130 during the particular time period. Data field 540 may store information identifying an amount and type of data transmitted or received by the particular WI-FI router 120 during the particular time period. For example, data field 540 may identify the amount of data transmitted by the particular WI-FI router 120 for each Quality of Service (QoS) class.

Other WI-FI routers field 550 may identify signals from other WI-FI routers 120 detected by the particular WI-FI router 120 during the particular time period on each channel and/or band scanned by the particular WI-FI router 120, such as, for example, values for one or more signal strength and/or quality parameters measured by the particular WI-FI router 120.

Although FIG. 5 shows exemplary components of usage data DB 435, in other implementations, usage data DB 435 may include fewer components, different components, additional components, or differently arranged components than depicted in FIG. 5.

Figure 6:
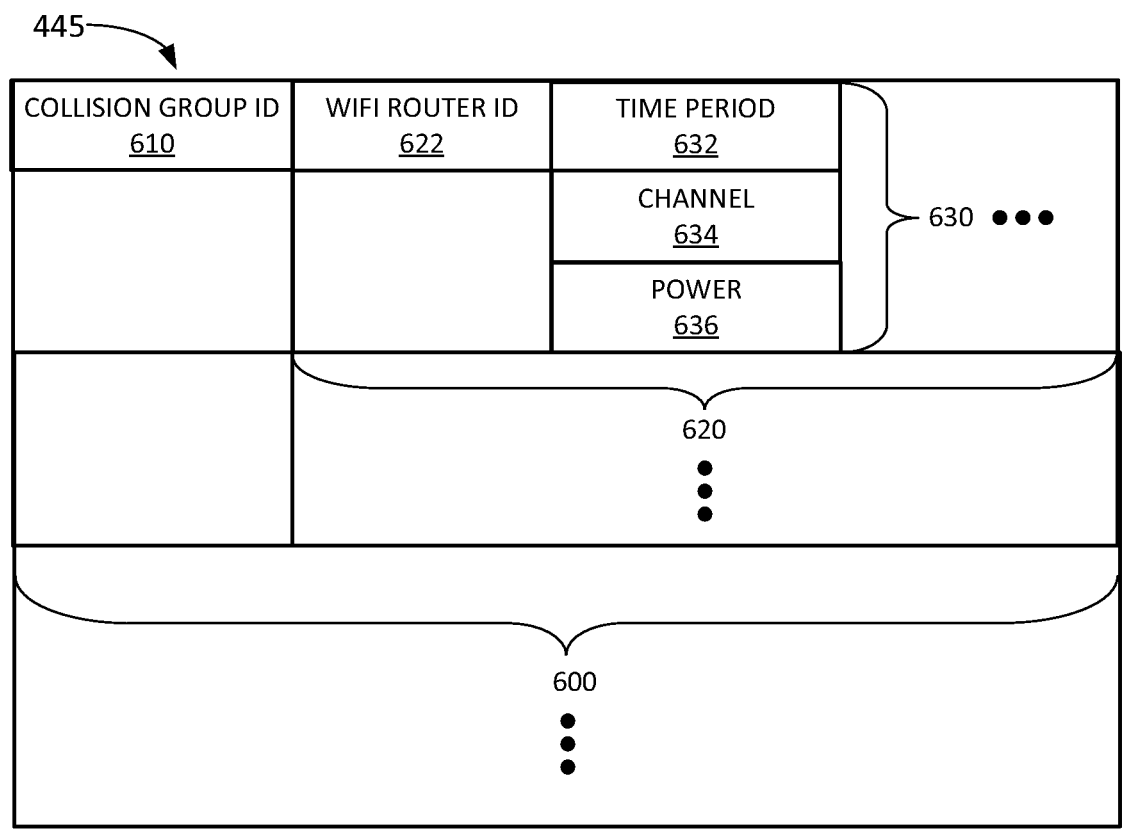
FIG. 6 illustrates exemplary components of a collision avoidance plan database according to an implementation described herein.

FIG. 6 illustrates exemplary components of collision avoidance plan DB 445. As shown in FIG. 6, collision avoidance plan DB 445 may include one or more collision group records 600. Each collision group record 600 may store information relating to a particular collision group of WI-FI routers 120. Each collision group may include a set of WI-FI routers 120 that may cause collisions among each other.

Collision group record 600 may include a collision group ID field 610 and collision avoidance plan records 620. Collision group ID field 610 may include an ID associated with a particular collision group. Each collision avoidance plan record 620 may store/represent a collision avoidance plan for a particular WI-FI router 120 in the particular collision group. A particular WI-FI router 120 may be a member of more than one collision group.

Collision avoidance plan record 620 may include a WI-FI router ID field 622 and one or more setting records 630. WI-FI router ID field 622 may store information identifying the particular WI-FI router 120 associated with the collision avoidance plan. Each settings record 630 may store information relating to the settings for the particular WI-FI router 120 during a particular time period. Settings record 630 may include a time period field 632, a channel field 634, and a power field 636. Time period field 632 may identify a time period. Channel field 634 may identify a channel and/or band to be used by the particular WI-FI router 120 during the time period. Power field 636 may identify an RF power to be used by the particular WI-FI router 120 during the time period.

The time period may identify a time of day, a day of the week, and/or a time slot in a set of time slots divided among WI-FI routers 120 in the collision group. In some implementations, such as when a collision group only experiences collisions among WI-FI routers 120 managed by WI-FI collision avoidance system 160 and the behavior of the WI-FI routers 120 does not vary over a specified interval, the collision avoidance plan may be static and each WI-FI router 120 may maintain the same setting throughout a time period. In other implementations, WI-FI routers 120 in the collision group may go through a series of settings over the time period based on the expected behavior of other WI-FI routers 120 in the collision group, such as expected changes in the traffic handled by particular WI-FI routers 120.

In yet other implementations, WI-FI routers 120 in the collision group may periodically cycle through a set of settings over a set of time periods in a longer time interval, such as over the course of a day, an hour, or even very short time intervals on the order of a second or less. For example, in some implementations, WI-FI routers 120 in a collision group may perform time division multiplexing with respect to a channel and/or transmission power in which each WI-FI router 120 in the collision group is assigned a time slot during which to exchange signals with client devices 130. Furthermore, in a time division multiplexing configuration of collision avoidance plans, different WI-FI routers 120 may be assigned different priorities based on historical data traffic. For example, a first WI-FI router 120 with a historical higher traffic load may be assigned more time slots than a second WI-FI router 120 with a historical low traffic load. In such implementations, collision avoidance plans may be dynamically adjustable, such that if the second WI-FI router 120 experiences a surge in the traffic load, the second WI-FI router 120 may be assigned additional time slots in the time division multiplexing collision avoidance scheme.

Although FIG. 6 shows exemplary components of collision avoidance plan DB 445, in other implementations, collision avoidance plan DB 445 may include fewer components, different components, additional components, or differently arranged components than depicted in FIG. 6.

Figure 7:
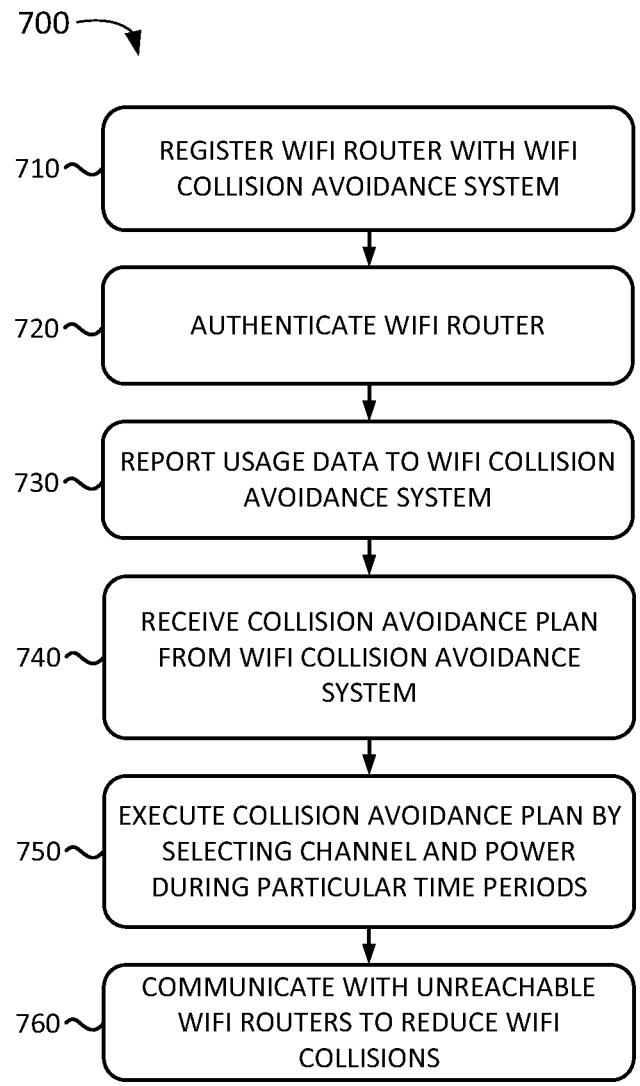
FIG. 7 is a flowchart of a process for collision avoidance according to an implementation described herein.

FIG. 7 is a flowchart of a process 700 for collision avoidance according to an implementation described herein. In some implementations, process 700 of FIG. 7 may be performed by WI-FI router 120. In other implementations, some or all of process 700 may be performed by another device or a group of devices.

As shown in FIG. 7, process 700 may include registering a WI-FI router with a WI-FI collision avoidance system (block 710) and authenticating the WI-FI router (block 720). For example, WI-FI router 120 may receive, via a push from WI-FI collision avoidance system 160, collision avoidance application 400. Collision avoidance application 400 may then send a registration request to WI-FI collision avoidance system 160. WI-FI collision avoidance system 160 may authenticate WI-FI router 120 by authenticating secure element 360 in WI-FI router 120 via secure element manager 420.

Process 700 may further include reporting usage data to the WI-FI collision avoidance system (block 730). For example, collision avoidance application 400 may send a usage data report to WI-FI collision avoidance system 160 at particular intervals. The usage data may include information relating to channels and RF power used by WI-FI router 120 during a time period, amount and type of data (e.g., QoS class associated with the data) exchanged between WI-FI router 120 and client devices 130, a signal strength measured by client device 130 during the time period, a signal strength of signal from client device 130 measured by WI-FI router 120 during the time period, and/or other types of WI-FI router parameters. Furthermore, the usage data may include information relating to signals from other WI-FI routers 120 detected by WI-FI scanner 320.

Process 700 may further include receiving a collision avoidance plan from the WI-FI collision avoidance system (block 740) and executing the collision avoidance plan by selecting the channel and power during particular time periods (block 750). For example, WI-FI router 120 may receive, at particular intervals, a collision avoidance plan from WI-FI collision avoidance system 160, store the collision avoidance plan, and execute the collision avoidance plan. For example, WI-FI router 120 may select the channel and/or band and set RF transmission power for communicating with client devices 130 for each time period based on the received collision avoidance plan.

Process 700 may further include communicating with unreachable WI-FI routers o reduce WI-FI collisions (block 760). For example, WI-FI router 120 may broadcast a "tracer shot packet" to third-party WI-FI router 182 and/or unreachable WI-FI router 190, which may include information relating to a collision avoidance plan implemented by WI-FI router 120. As another example, WI-FI router 120 may communicate directly with third-party WI-FI router 182 and/or unreachable WI-FI router 190 using WI-FI signals to perform negotiations to arrive at mutually agreeable collision avoidance plans. If WI-FI router 120 and third-party WI-FI router 182 and/or unreachable WI-FI router 190 mutually agree on a set of collision avoidance plans, WI-FI router 120 may store information relating to the set of collision avoidance plans in blockchain DB 355 and implement its collision avoidance plan based on the information stored in blockchain DB 355.

Figure 8:
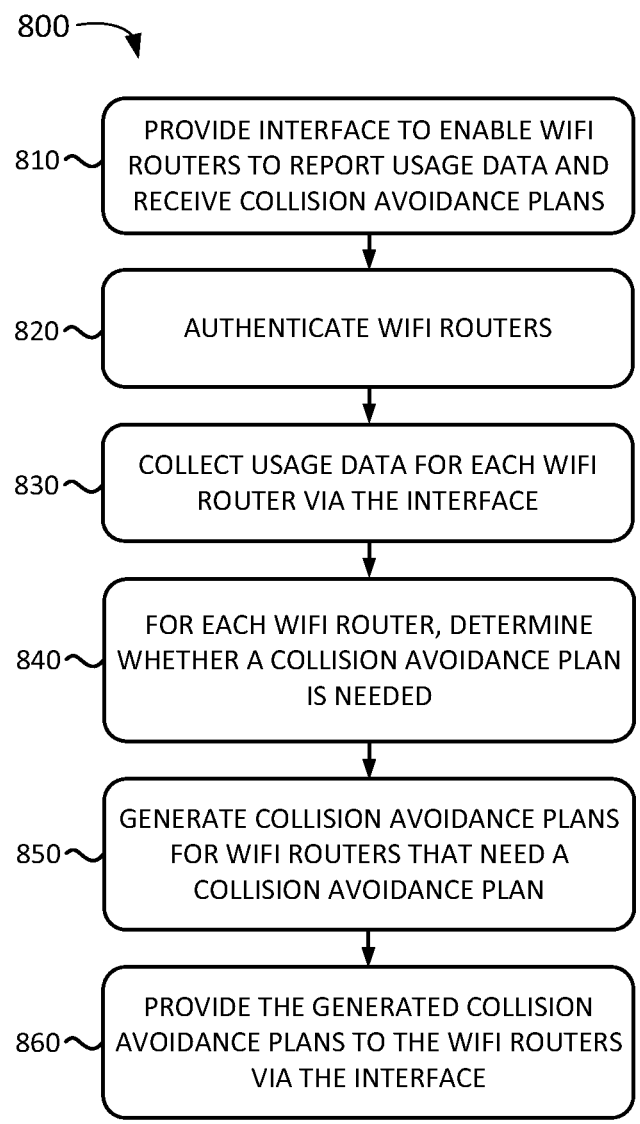
FIG. 8 is a flowchart of a process for managing collision avoidance according to an implementation described herein.

FIG. 8 is a flowchart of a process 800 for managing collision avoidance according to an implementation described herein. In some implementations, process 800 may be performed by WI-FI collision avoidance system 160. In other implementations, some or all of process 800 may be performed by another device or a group of devices.

As shown in FIG. 8, process 800 may include providing an interface to enable WI-FI routers to report usage data and receive collision avoidance plans (block 810) and authenticating WI-FI routers (block 820). For example, WI-FI collision avoidance system 160 may provide collision avoidance application 400 to WI-FI routers 120 and may provide an API via router interface 410 to enable collision avoidance application 400 in WI-FI routers 120 to communicate with WI-FI collision avoidance system 160. Furthermore, WI-FI collision avoidance system 160 may authenticate secure element 360 in WI-FI routers 120 by, for example, ensuring credentials stored in secure element 360 are valid and that WI-FI router 120 is authorized to access provider network 150 via WAN device 140.

Process 800 may further include collecting usage data for each WI-FI router via the interface (block 830) and determining, for each WI-FI router, whether a collision avoidance plan is needed (block 840). For example, WI-FI collision avoidance system 160 may receive, at particular intervals, usage data from WI-FI routers 120 and store the usage data in usage data DB 435. WI-FI collision avoidance system 160 may determine whether a collision avoidance plan is needed for each WI-FI router 120 based on the location of the particular WI-FI router 120 with respect to other WI-FI routers 120 (and/or third-party WI-FI routers 182), based on whether WI-FI router 120 has experienced a WI-FI collision with another router, based on whether another WI-FI router 120 is within transmission range, based on whether WI-FI router 120 experienced low signal strength below a signal strength threshold, based on whether WI-FI router 120 has detected signals from another WI-FI router 120 during a WI-FI scan, and/or based on other criteria indicative of interference between WI-FI routers 120.

Process 800 may further include generating collision avoidance plans for WI-FI routers that need a collision avoidance plan (block 850) and provide the generated collision avoidance plans to the WI-FI routers via the interface (block 860). For example, WI-FI collision avoidance system 160 may group WI-FI routers 120 that are determined to need a collision avoidance plan into collision avoidance groups based on geographic location, address (e.g., WI-FI routers 120 in the same building, adjacent building, etc.), based on WI-FI routers 120 that detected one another during a WI-FI scan, and/or based on other criteria. In some implementations, collision avoidance coordinator 440 may cluster WI-FI routers 120 into collision groups using ML model 450.

WI-FI collision avoidance system 160 may coordinate collision avoidance plans in a collision group by selecting time periods, channels and/or bands, and RF transmission power levels for WI-FI routers 120 in the collision group to reduce and/or minimize WI-FI collisions between WI-FI routers 120 in the collision group. WI-FI collision avoidance system 160 may then provide the generated collision avoidance plans to WI-FI routers 120 in the collision group. WI-FI collision avoidance system 160 may update the collision avoidance plans at particular intervals and provide the updated collision avoidance plans to WI-FI routers 120.

Figure 9:
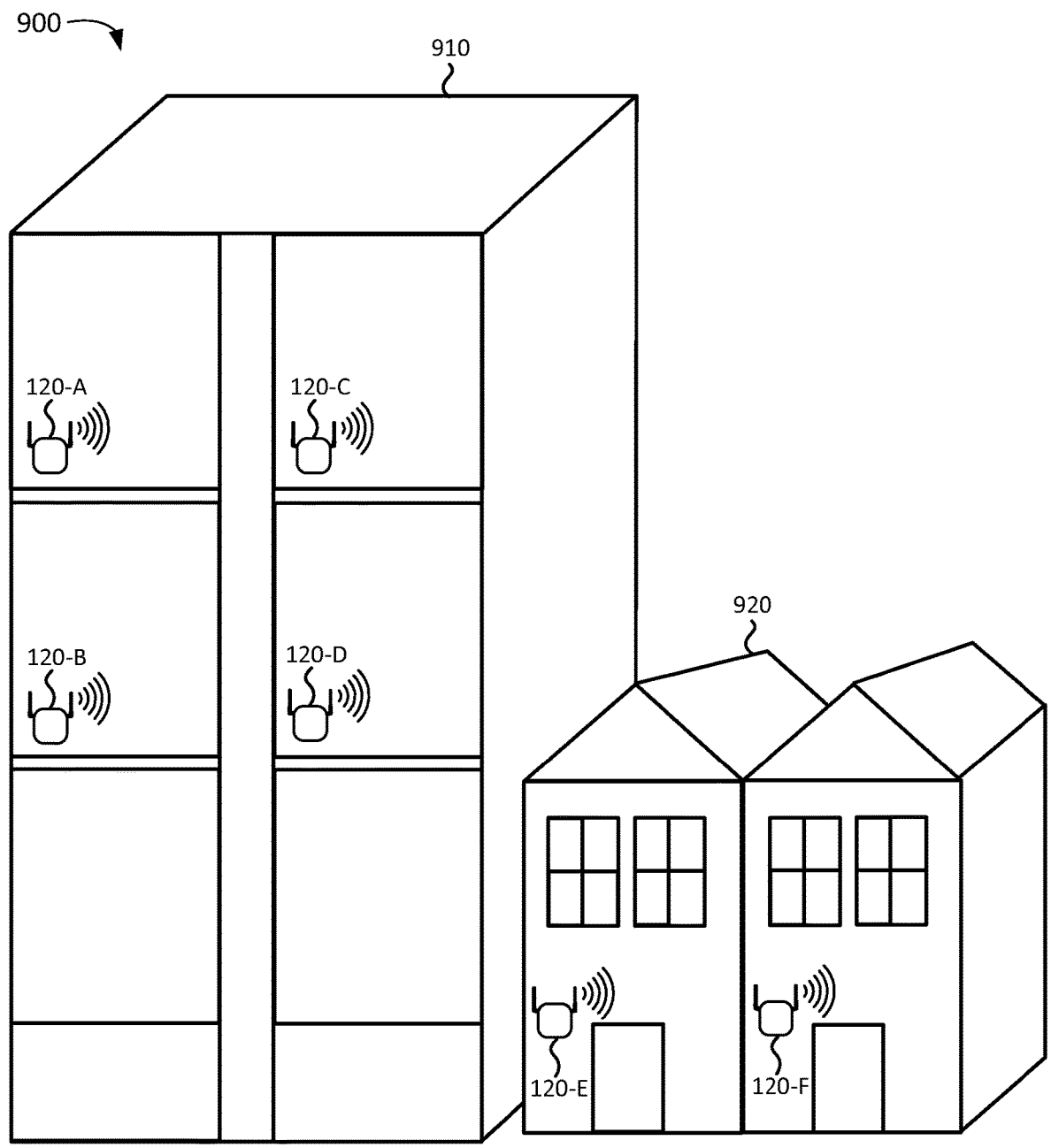
FIG. 9 illustrates an exemplary environment according to an implementation described herein.

FIG. 9 illustrates an exemplary environment 900 according to an implementation described herein. As shown in FIG. 9, environment 900 includes an apartment building 910 and adjacent townhomes 920. Apartment building 910 may include WI-FI routers 120-A, 120-B, 120-C, and 120-D, each of which is in a different apartment and associated with a separate CPE network 110. WI-FI routers 120-A, 120-B, 120-C, and 120-D may be managed by the same provider and include collision avoidance application 440 received from WI-FI collision avoidance system 160. Townhomes 920 may include a WI-FI router 120-E and WI-FI router 120-F. WI-FI router 120-E may be associated with third-party network 180 and may be able to exchange information with WI-FI collision avoidance system 160 via third-party interface 460. WI-FI router 120-F may be associated with an unknown ISP and may be unreachable by WI-FI collision avoidance system 160.

Figure 10:
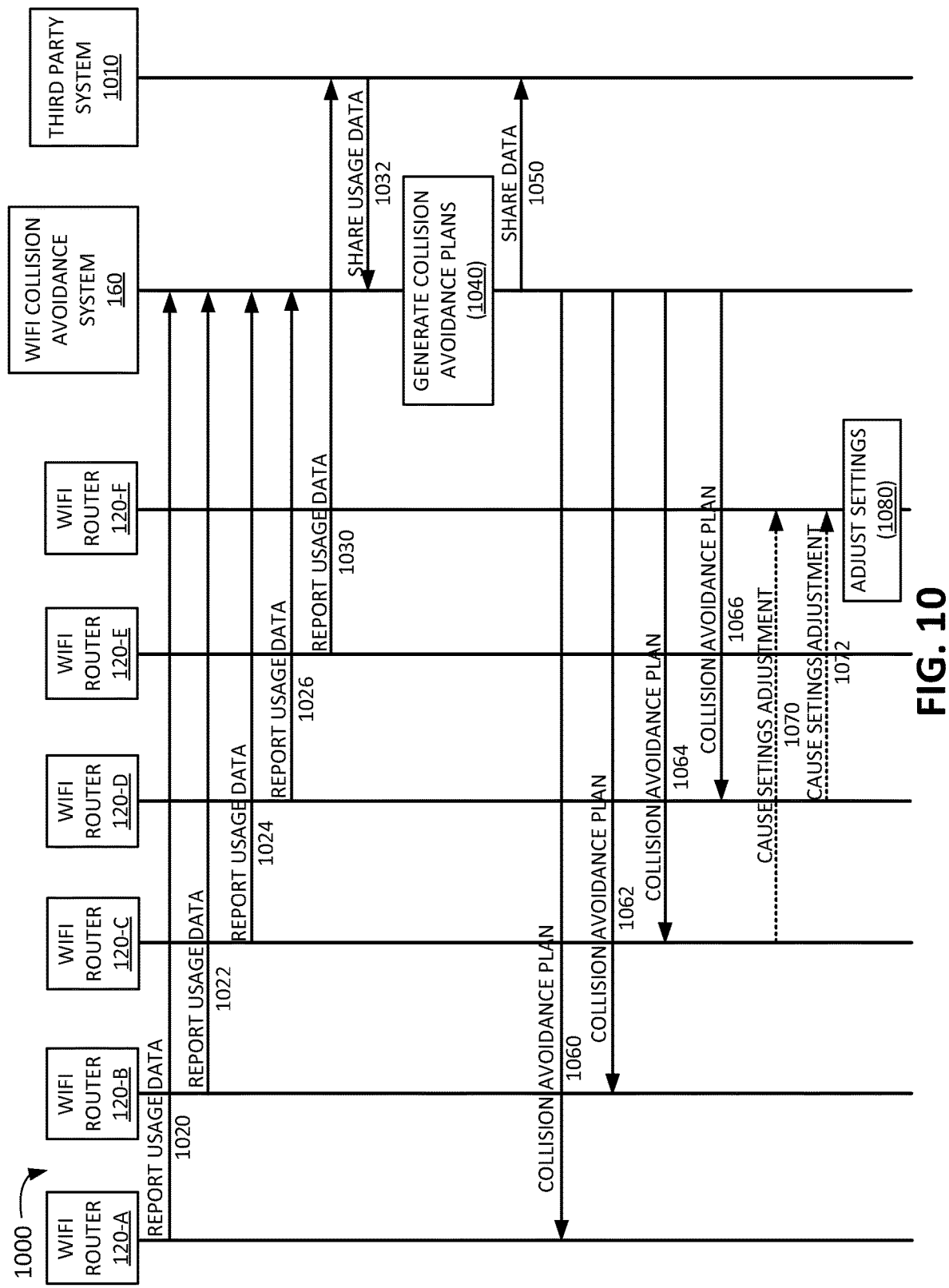
FIG. 10 illustrates an exemplary signal flow for collision avoidance according to an implementation described herein.

FIG. 10 illustrates an exemplary signal flow 100 for collision avoidance associated with environment 900 of FIG. 9. As shown in FIG. 10, signal flow 1000 may include WI-FI router 120-A, WI-FI router 120-B, WI-FI router 120-C, and WI-FI router 120-D sending usage data to WI-FI collision avoidance system 160 (signals 1020, 1022, 1024, and 1026). Furthermore, WI-FI router 120-E may send usage data to a third-party system 1010 in third-party network 180 (signal 1030). Third-party system 1010 may share the usage data for WI-FI router 120-E with WI-FI collision avoidance system 160 via third-party interface 460 (signal 1032). Additionally, the usage data received from WI-FI routers 120-C and 120-D may indicate interference from router 120-F based on WI-FI scans performed by WI-FI routers 120-C and 120-D.

WI-FI collision avoidance system 160 may generate collision avoidance plans for WI-FI routers 120-A, 120-B, 120-C, and 120-D based on the received usage data (block 1040). The collision avoidance plan for each WI-FI router may specify a channel and power level for each of a set of upcoming time periods. WI-FI collision avoidance system 160 may share usage data relevant to WI-FI router 120-E with third-party system 1010 via third-party interface 460 (signal 1050) and may send individualized collision avoidance plans to WI-FI router 120-A, WI-FI router 120-B, WI-FI router 120-C, and WI-FI router 120-D (signals 1060, 1062, 1064, and 1066). WI-FI router 120-A, WI-FI router 120-B, WI-FI router 120-C, and WI-FI router 120-D may carry out the collision avoidance plans to prevent transmission collisions between each other and with WI-FI router 120-E and WI-FI router 120-F. Furthermore, the collision avoidance plans for WI-FI routers 120-C and 120-D may cause unreachable router 120-F to adjust settings (items 1070 and 1072) to reduce collisions with WI-FI routers 120-C and 120-D (block 1080). For example, WI-FI routers 120-C and 120-D may increase transmission power together on a same channel that is also being used by WI-FI router 120-F, causing WI-FI router 120-F to switch to a different channel.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   collecting, by a device, first usage data from a first WI-FI router in a first customer premises equipment (CPE) network;
   collecting, by the device, second usage data from a second WI-FI router in a second CPE network;
   determining, by the device, that a collision avoidance plan between the first WI-FI router and the second WI-FI router is needed;
   generating, by the device, a first collision avoidance plan for the first WI-FI router and a second collision avoidance plan for the second WI-FI router based on the first usage data and the second usage data; and
   providing, by the device, the first generated collision avoidance plan to the first WI-FI router and the second collision avoidance plan to the second WI-FI router.

2. The method of claim 1, wherein the first usage data includes one or more parameters associated with the first WI-FI router during a time period, wherein the one or more parameters include one or more of:
   information identifying a channel used by the first WI-FI router during the time period;
   an amount of data sent or received using the channel;
   a type of data sent or received using the channel;
   a radio frequency power generated by the first WI-FI router during the time period;
   a signal strength measured by a client device of the first WI-FI router during the time period; or
   a signal strength of the client device signal measured by the first WI-FI router during the time period.

3. The method of claim 1, wherein the first usage data includes historical usage data collected over a plurality of time periods.

4. The method of claim 1, wherein the first collision avoidance plan includes:
   a plurality of time period settings, wherein a time period setting, of the plurality of time period settings, specifies a channel and a radio frequency power to be used by the first WI-FI router during a time period corresponding to the time period setting.

5. The method of claim 1, further comprising:
providing an application to the first WI-FI router, wherein the application collects the usage data for the first WI-FI router and executes the first collision avoidance plan for the first WI-FI router.

6. The method of claim 1, further comprising:
providing, by the device, an interface to enable collision avoidance for WI-FI routers associated with a different provider of communication services;
receiving, via the interface, third usage data from a third WI-FI router associated with the different provider;
determining that another collision avoidance plan is needed between the third WI-FI router and at least one of the first WI-FI router and the second WI-FI router;
generating a third other collision avoidance plan for the third WI-FI router and a fourth collision avoidance plan for the at least one of the first WI-FI router or the second WI-FI router; and
providing the third collision avoidance plan to the third WI-FI router and the fourth collision avoidance plan to the at least one of the first WI-FI router and the second WI-FI router.

7. The method of claim 1, further comprising:
authenticating the first WI-FI router using a secure element installed on the first WI-FI router.

8. The method of claim 1, further comprising:
obtaining, by the device, network performance information from a network management system relating to at least one of the first CPE network or the second CPE network; and
wherein generating the first collision avoidance plan for the first WI-FI router is based on the obtained network performance information.

9. The method of claim 8, further comprising:
reporting, by the device, at least one of the first usage data or the second usage data to the network management system.

10. The method of claim 1, wherein generating the first collision avoidance plan for the first WI-FI router and the second collision avoidance plan for the second WI-FI router includes:
using a trained machine learning model to generate the first collision avoidance plan and the second collision avoidance plan.

11. The method of claim 1, further comprising:
obtaining, by the device, from the first WI-FI router, information indicating interference from a third WI-FI router, wherein the third WI-FI router is not reachable via the device; and
wherein generating the first collision avoidance plan for the first WI-FI router includes:
generating a plurality of settings for the first WI-FI router, wherein the plurality of settings causes the third WI-FI router to adjust a setting to reduce the interference form the third WI-FI router.

12. A device comprising:
a processor configured to:
collect first usage data from a first WI-FI router in a first customer premises equipment (CPE) network;
collect second usage data from a second WI-FI router in a second CPE network;
determine that a collision avoidance plan between the first WI-FI router and the second WI-FI router is needed;
generate a first collision avoidance plan for the first WI-FI router and a second collision avoidance plan for the second WI-FI router based on the first usage data and the second usage data; and
provide the first generated collision avoidance plan to the first WI-FI router and the second collision avoidance plan to the second WI-FI router.

13. The device of claim 12, wherein the first usage data includes one or more parameters associated with the first WI-FI router during a time period, wherein the one or more parameters include one or more of:
information identifying a channel used by the first WI-FI router during the time period;
an amount of data sent or received using the channel;
a type of data sent or received using the channel;
a radio frequency power generated by the first WI-FI router during the time period;
a signal strength measured by a client device of the first WI-FI router during the time period; or
a signal strength of the client device signal measured by the first WI-FI router during the time period.

14. The device of claim 12, wherein the first collision avoidance plan includes:
a plurality of time period settings, wherein a time period setting, of the plurality of time period settings, specifies a channel and a radio frequency power to be used by the first WI-FI router during a time period corresponding to the time period setting.

15. The device of claim 12, wherein the processor is further configured to:
provide an application to the first WI-FI router, wherein the application collects the usage data for the first WI-FI router and executes the first collision avoidance plan for the first WI-FI router.

16. The device of claim 12, wherein the processor is further configured to:
provide an interface to enable collision avoidance for WI-FI routers associated with a different provider of communication services;
receive, via the interface, third usage data from a third WI-FI router associated with the different provider;
determine that another collision avoidance plan is needed between the third WI-FI router and at least one of the first WI-FI router and the second WI-FI router;
generate a third other collision avoidance plan for the third WI-FI router and a fourth collision avoidance plan for the at least one of the first WI-FI router or the second WI-FI router; and
provide the third collision avoidance plan to the third WI-FI router and the fourth collision avoidance plan to the at least one of the first WI-FI router and the second WI-FI router.

17. The device of claim 12, wherein the processor is further configured to:
obtain network performance information from a network management system relating to at least one of the first CPE network or the second CPE network; and
wherein the processor is configured to generate the first collision avoidance plan for the first WI-FI router based on the obtained network performance information.

18. The device of claim 12, wherein, when generating the first collision avoidance plan for the first WI-FI router and the second collision avoidance plan for the second WI-FI router, the processor is further configured to:
use a trained machine learning model to generate the first collision avoidance plan and the second collision avoidance plan.

19. The device of claim 12, wherein the processor is further configured to:
  obtain, from the first WI-FI router, information indicating interference from a third WI-FI router, wherein the third WI-FI router is not reachable via the computer device; and
  wherein, when generating the first collision avoidance plan for the first WI-FI router, the processor is further configured to:
    generate a plurality of settings for the first WI-FI router, wherein the plurality of settings at the first WI-FI router causes the third WI-FI router to adjust a setting to reduce the interference at the first WI-FI router.

20. A non-transitory computer-readable memory device storing instructions executable by a processor, the non-transitory computer-readable memory device comprising:
  one or more instructions to collect first usage data from a first WI-FI router in a first customer premises equipment (CPE) network;
  one or more instructions to collect second usage data from a second WI-FI router in a second CPE network;
  one or more instructions to determine that a collision avoidance plan between the first WI-FI router and the second WI-FI router is needed;
  one or more instructions to generate a first collision avoidance plan for the first WI-FI router and a second collision avoidance plan for the second WI-FI router based on the first usage data and the second usage data; and
  one or more instructions to provide the first generated collision avoidance plan to the first WI-FI router and the second collision avoidance plan to the second WI-FI router.

* * * * *